Dec. 1, 1953  L. A. PARADISE  2,660,852
MULTIROW COTTON HARVESTER
Filed Oct. 1, 1949  2 Sheets-Sheet 1

INVENTOR.
L. A. PARADISE

ATTORNEYS

Dec. 1, 1953

L. A. PARADISE 2,660,852

MULTIROW COTTON HARVESTER

Filed Oct. 1, 1949

INVENTOR.
L.A. PARADISE

ATTORNEYS

Patented Dec. 1, 1953

2,660,852

UNITED STATES PATENT OFFICE 2,660,852

MULTIROW COTTON HARVESTER

Louis A. Paradise, Moline, Ill., assignor to Deere & Company, Moline, Ill., a corporation of Illinois Application October 1, 1949, Serial No. 119,143

15 Claims. (Cl. 56—47)

This invention relates to a harvester and more particularly to a crop harvester of the type adapted to harvest crops simultaneously from a plurality of adjacent parallel rows. Still more particularly, the invention relates to a multi-row cotton picker.

There are several known types of crop harvesters adapted to harvest crops simultaneously from a plurality of adjacent rows. In many instances, whether or not a machine can be designed and operated as a multi-row harvester depends largely upon the type of crops being harvested. For example, it is relatively easy to design a corn picker that can pick two—and even four—rows of corn simultaneously, since corn is a crop that lends itself readily to harvesting by multi-row picking machines.

The conventional agricultural tractor is designed to accommodate row-crop operation of many kinds, including cultivating and harvesting in particular, and variations in wheel tread and adjustability of cultivating and harvesting implements make it possible for such tractor and associated implements to be readily accommodated to fields in which the rows are laid out or spaced at different intervals than rows in other fields. The very nature of a crop such as corn imposes no particular problem, since the picking mechanism is relatively simple and of relatively small lateral dimension compared with the picking mechanism necessary to harvest crops such as cotton, for example.

In any row-crop operation, the tractor or equivalent vehicle usually has such characteristic design as to place a pair of transversely spaced wheels astride a pair of adjacent rows so that one wheel runs immediately outside one row and the other wheel runs immediately outside the other row. If the tractor or equivalent vehicle is of the tricycle type, the single additional wheel or truck runs between the two rows of said pair of adjacent rows. For operation as a two-row machine, the tractor or vehicle will carry picking mechanism spaced apart transversely and positioned to operate respectively on plants in the two rows.

Substantially the same line of endeavor has been followed in the design of mobile units for picking cotton. Of the various types of picking mechanisms experimented with in the past, the choice of the majority of designers is the picking unit comprising a pair of drum-like elements having a plurality of horizontally spaced layers or series of picking spindles projectable into the cotton plant from one side of the row and movable lengthwise of the row in an orbit or closed path. There are two such drums, one at each side of a particular row. In some cases, the drums are made up of a series of columns arranged in circumferentially spaced relationship, each column having a plurality of generally radially and horizontally projecting spindles. Mechanism is provided for moving the columns through the orbit or closed path and at the same time for rotating the spindles, which are barbed to accumulate cotton thereon. Since the spindles of the companion drums are projected into the plants from opposite sides, it is important to offset the drums longitudinally of the direction of travel so that the spindles do not conflict. Substantially the same problems are involved in other types of picking units, wherein the drum-like elements may include a plurality of horizontally movable continuous belts, for in either case the spindles move in orbits or closed paths. The fundamental of either design is that the spindles are projected into the cotton plants to accumulate cotton thereon and then are withdrawn from the plants and are moved through suitable doffing mechanism which functions to remove the cotton from the spindles so that the picked cotton may be conveyed to a suitable receptacle.

Because of the inherent complexity and size of the picking elements, most mobile cotton pickers in the past have been of the one-row type. This is so, because it has heretofore been impossible to place the pair of drums of one unit alongside the pair of drums of another unit on account of interference between the inner drums of the units; that is, because of interference or overlapping between the spindles or equivalent picking members of the inner drums. Hence, any known machines of the two-row type have included longitudinally spaced units, one being at the front of the mobile frame and the other being at the rear of the mobile frame so that there would be sufficient distance between the units to avoid overlapping or conflict between the inner spindles.

There are several disadvantages inherent in a machine of this type. First of all, the machine must be made of relatively substantial length to accommodate the longitudinally spaced units. Second, both units are not advantageously placed with respect to the operator of the machine, since it is virtually impossible to locate the operator in such position that will enable him to see cotton plants entering both units. The importance of the factor of visibility will become apparent when it is considered that most one-row machines are so designed that the operator is above and alongside the single unit. Furthermore, the longitudinal spacing of the units renders it impossible to adequately guide the machine, because steering of the machine to accommodate plants in one unit will obviously misaline the other unit with respect to the plants.

According to the present invention, all the disadvantages of a two-row machine as known in the past are eliminated and at the same time all the advantages of the one-row machine are retained. This result is achieved by use of a design which involves basically the provision of a pair of redesigned one-row units placed side-by-side and in transverse alinement. Thus, both units are placed in such position that the operation of the machine may watch plants in both rows at the same time.

It is an important feature of the invention, by means of which the two-row design is accomplished, to arrange a pair of units in side-by-side relationship and to provide each unit with a pair of picking elements, one element in each unit being an outer element and the other being an inner element. The outer elements are in transverse alinement and the inner elements are in transverse alinement, but the inner elements are offset longitudinally with respect to the transversely alined outer elements. Inasmuch as the inner elements are relatively closely spaced apart, they are designed to have reduced size and therefore reduced capacity so that the picking members or spindles thereof will not overlap or conflict across the longitudinal centerline between the two adjacent rows being picked. It is fundamental in the achievement of this object of the invention that the inner elements can be so reduced in size and capacity without sacrificing much in the over-all efficiency of the machine. It has been discovered that in the ordinary cotton picker, with one drum placed ahead of the other, the leading drum picks a considerably larger percentage of the cotton than does the trailing drum, which operates at the other side of the row. In the present design, the larger drum in each unit is preferably placed ahead of the smaller drum and arranged to operate outside the particular row. Hence, the larger drum picks the greater proportion of cotton, whereas the smaller drum picks the smaller proportion. In other words, the drums are proportioned commensurate with their picking capacity as related to their positions with respect to which is first to enter the row.

It is a further object of the invention to utilize to as great an extent as possible conventional picking elements or drums. Another object of the invention is to arrange the doffing mechanism for the picker spindles in such manner that the over-all width of the machine is kept at a minimum and so that the doffers for the inner drums are located respectively at opposite sides of the longitudinal centerline that lies midway between the two rows and hence that lies midway between the two units.

It is a still further object of the invention to provide a cotton picker of the mobile type comprising a longitudinal frame having a pair of transversely spaced and alined wheels and to arrange the picking units in transverse alinement and in such a manner as to extend transversely across the frame generally between the outer upright longitudinal planes of the wheels, whereby the machine may be operated astride a pair of adjacent rows without interfering with the cotton plants in nearby rows.

The foregoing and other important objects and desirable features encompassed by and inherent in the present invention will become apparent as a preferred embodiment of the invention is completely disclosed in the following detailed description and accompanying sheets of drawings, in which Figure 1 is a perspective view of a mobile cotton harvester;

Figure 3 is a side elevational view, with the near wheel removed, of the forward portion of the machine as illustrated in Figure 2;

Figure 4 is an enlarged plan view of one of the picking units, certain portions of the uppermost structure being broken away to expose the picking mechanism therebelow; and Figure 5 is a fragmentary sectional view, drawn to an enlarged scale, taken substantially along the line 5—5 of Figure 4.

Figure 1:
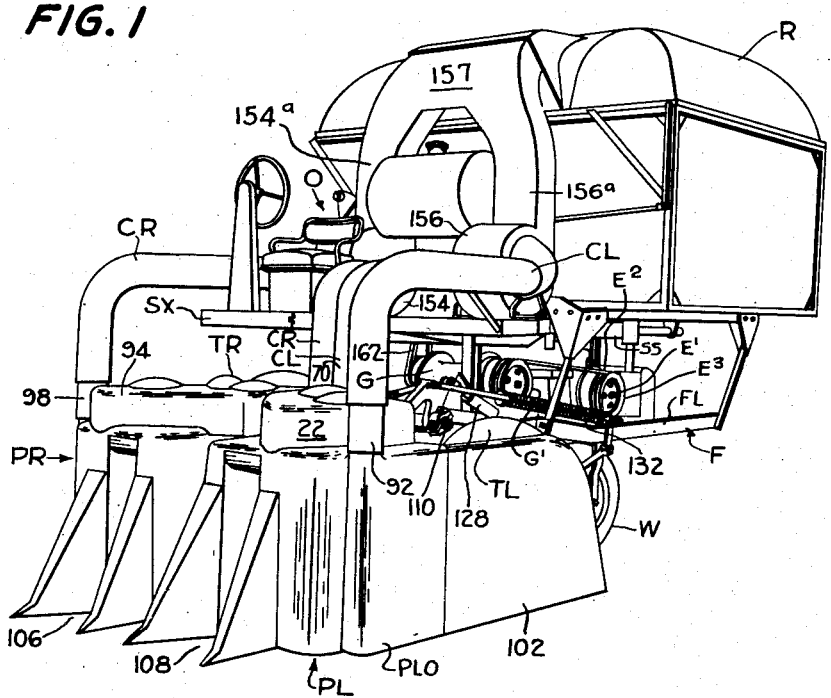
Figure 2:
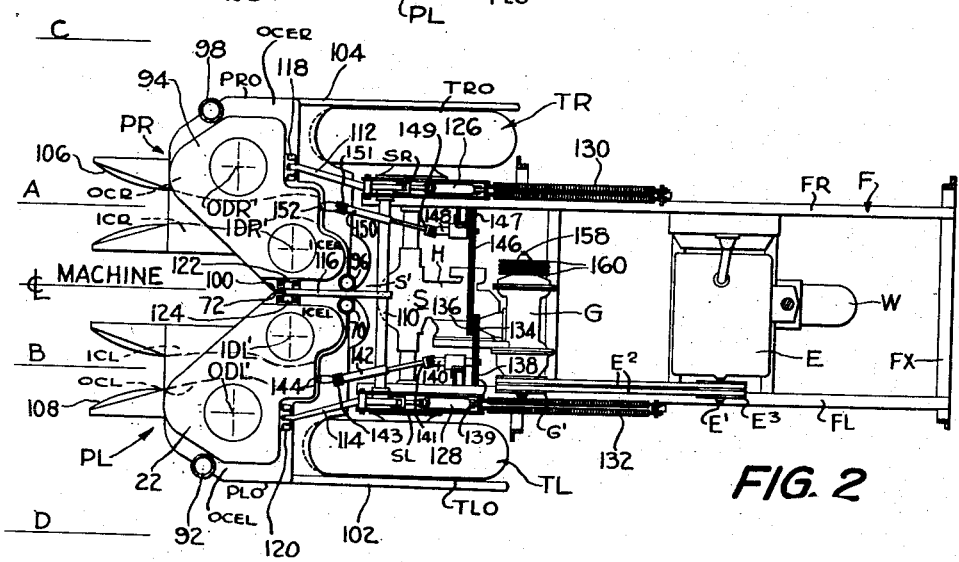
Figure 2 is a plan view, on a slightly reduced scale, of the machine shown in Figure 1, omitting the receptacle and allied superstructure.

General construction (Figures 1 and 2)

The machine comprises essentially a longitudinal frame F carried at its front end on a pair of large, transversely spaced and alined traction wheels, these being right and left wheels TR and TL respectively. The frame F has right- and left-hand longitudinal side members FR and FL respectively and a rear cross member FX; and the rear end of the frame F is carried on a steerable truck comprising a single wheel W.

The machine carries at its forward end a pair of transversely spaced and alined picking units designated PR and PL. These units are preferably disposed ahead of the traction wheels TR and TL and respectively operate on plants in rows A and B. In Figure 2, other and adjacent rows C and D are indicated to give a general idea of the over-all width of the machine.

The machine is preferably of the self-propelled type and for that purpose is equipped with an internal combustion engine E having an output shaft $E^1$ which transmits power to a gear case G by means of belts $E^2$ and sheaves $E^3$ and $G^1$. The gear case contains suitable power-transmitting mechanism (not shown) by means of which power is transmitted ultimately to the traction wheels TR and TL, the power train being very similar to that of any conventional agricultural tractor. The traction wheels are located at opposite ends of a transverse axle structure S which includes opposite depending housings SR and SL to give the axle added clearance and which includes a central transmission and differential housing H appropriately associated with the gear case G.

The machine includes superstructure SS comprising framework that carries at the rear of the machine a receptacle or basket R to which cotton is transferred from the picking units PR and PL by means of a pneumatic system including appropriate ducts or conduits CR and CL. The forward central part SX of the superstructure which is above the axle structure and overhangs a mounting or picker-accommodating space S' between the wheels TR and TL includes an operator's station O which has an operator's seat and suitable controls incidental to the operation of the machine.

Detailed description of the picking units

In this phase of the description, particular reference will be had to Figures 4 and 5. Since the two picking units PR and PL are symmetrical, only one will be described in detail. That illustrated in Figures 4 and 5 is the unit PL.

This unit comprises a pair of harvesting or picking elements or devices, one being an inner element or drum IDL and the other being an outer element or drum ODL, which operate respectively on the inside and outside of plants along the row B. The inner drum comprises essentially a structure that may be very similar to that disclosed in the U. S. patent to Johnston 2,140,631, and has a central supporting shaft 10 (Figure 5) to the upper end of which is fixed a circular head member 12. The shaft 10 has keyed thereto an upper coaxial extension 14 that is journaled in suitable spaced-apart bearings 16, 18 and 20 carried in a supporting housing or casting 22. The drum IDL is thus rotatably suspended from the casting or support 22 and is driven by mechanism including a gear 24 fixed to the shaft extension 14 between the bearings 16 and 18. The gear 24 is in constant mesh with a smaller gear or pinion 26 which is coaxial with and fixed to a driving sprocket 28. This sprocket receives power from the internal combustion engine E by means that will be generally described below.

Those to whom the general details of construction are familiar will appreciate that there is at the bottom of the shaft 10 a suitable support therefor, plus an additional circular member somewhat like the circular head member 12. These two head members support therebetween a plurality of circumferentially spaced tubular columns 30. Each column is angularly movable about its vertical axis in the supporting members (such as in the circular head member 12), a bearing 32, and a similar and coaxial bearing in the bottom member (not shown but assumed to be present on the basis of the above reference to the Johnston patent), being provided for each column for this purpose. The columns, together with the supporting circular member 12 and the bottom member (not shown), form a cage or drum rotatable about the axis of the shaft 10. Hence, the columns move through a circular orbit or closed circular path. At the same time, the columns 30 are individually oscillated in their bearings 32. For this purpose, each column extends upwardly past the circular member 12 and has fixed thereto a crank 34 which is provided with a roller 36 that operates in a cam track 38 formed in a cam member or plate 40. This member 40 is fixed as respects the supporting structure or casting 22. The cam track, as will best be seen in Figure 4, is non-circular and hence defines an orbit or closed path different from the circular orbit through which the columns move.

Each of the tubular columns 30 carries rotatably therein and coaxial therewith a shaft 42 to which is fixed at vertically spaced intervals a plurality of small bevel pinions 44. The shaft 42 projects at the upper end of the columns 30 and has keyed thereto a small pinion 46 which is in constant mesh with a large gear 48 fixed to a sleeve 50 that surrounds and is rotatable relative to the shaft extension 14. The sleeve fixedly carries a gear 51 that is in constant mesh with a pinion 53 fixed to the pinion 26. Hence, the drum IDL is rotatable about the axis of the shaft 10 relative to the gear 48, the drum shaft 10 and gear 48 being driven at different speeds because of the different gear ratios at 26—24 and 53—51. The shafts 42 in the columns 30 are therefore rotated at a relatively high speed.

Each column 30 is provided, at vertically spaced intervals on the order of the spacing of the bevel pinions 44, with a plurality of outwardly opening bearing portions 52. Each of these bearing portions carries rotatably therein a generally radially outwardly extending picking member or spindle 54. The inner end of each spindle has a small bevel pinion 56 in constant mesh with the respective bevel pinion 44 on the shaft 42. Although the axes of the spindles 54 are slightly inclined to the horizontal, it will be noted that the outer surfaces of the spindles are conical. Hence, the uppermost element in the cone of each spindle lies in a horizontal plane and always remains in that horizontal plane as the spindles rotate and move through their orbits.

In a preferred construction built along the lines of the present invention, there will be in the inner drum IDL twelve columns 30. Each of these columns will carry twenty spindles 54. Hence, the spindles are in vertically spaced, horizontal series or layers, the spindles of each series being movable through an orbit determined by the cam track 38. Since the series of spindles are identical, and since all are controlled by the cam track 38, all the orbits of spindle movement will be the same. For all practical purposes, the structure may be considered as having a single series of spindles.

There is provided below the casting or supporting structure 22 a horizontal plate 58 which is apertured at 60 to accommodate the drum IDL. A similar plate (not shown) may be provided at the bottom of the drum structure. These plates serve to journal opposite end portions of a vertical doffer shaft 62. This shaft is part of a left-hand inner doffing means 63 for the drum IDL and has keyed thereto, at vertically spaced intervals on the order of the vertical spacing of the series or layers of spindles 54, a plurality of rotatable doffing members 64. In Figure 4, the upper casting structure 22 has been omitted from the view and the plate 58 has been broken away at 66 to expose certain of the spindles 54 and again at 68 to expose the upper doffer 64. It will be seen that the doffing means is rearwardly of and substantially in longitudinal alinement with the inner drum IDL.

The direction of travel of the machine is indicated by an appropriate legend in Figure 4. The path of movement of the spindles 54 is rearward, as indicated by the arrow Y in Figure 4, or in a counterclockwise direction as viewed from above. The direction of rotation of the doffers 64 is also counterclockwise as viewed from above. The design of the cam track 38 is such as to cause the spindles to enter or project into the plants along the row B. While the spindles are moving rearwardly in the row and the machine is moving forwardly, the spindles are rotating and accumulate cotton thereon. The spindles then exit or retract from the plants in the row and are brought about toward the doffers 64 so that they enter the doffers while in positions substantially tangent to a circle about the axis of the doffer shaft 62. Cotton is thus wiped from the spindles and is carried around by the doffers to conveying or receiving means in the form of a cotton outlet in the form of a vertical tube 70 which forms part of the left-hand pneumatic system CL. The tube 70 is rearwardly of and generally in longitudinal alinement with the doffers 64. The series of doffers 64 is located substantially immediately to the rear of the inner drum IDL. This location of the doffers confines the doffing means 63 to its own side of the centerline of the machine and minimizes the over-all width of the inner drum structure and its related parts, as will be evidenced by the relatively small transverse dimension between the centerline of the machine and the centerline of the row B.

The supporting or housing structure by means of which the left-hand picking unit PL is mounted on the machine includes an appropriate casing comprising the upper casting 22, the upper plate 58, and an inner upright longtudinal wall 72. This wall lies closely along and parallels the longitudinal centerline of the machine and not only defines the right-hand side of an inner compartment ICL that contains the drum structure IDL but separates the picking unit PL from the picking unit PR.

The companion picking element for the inner drum IDL comprises the outer drum ODL, previously referred to. The outer drum structure is very similar to but larger than the inner drum. The upper casting structure 22 rotatably carries a vertical sleeve 74 comparable to the sleeve 50 on the inner drum structure. An outer drum vertical shaft 76, which is comparable to the inner drum shaft 14, is associated with appropriate carrying structure for mounting a plurality of outer drum columns 78. These columns carry spindles 80 identical to the spindles 54. The outer drum is substantially larger than the inner drum and for that purpose is provided with a greater number of columns and consequently a greater number of spindles. In the particular construction illustrated, there are sixteen columns 78 in the outer drum and each has twenty spindles. These columns are controlled by a cam track 82 provided in a cam member 84, these components being similar to those previously described at 38 and 40. An intermediate portion of the upper plate 58 has been broken out additionally at 86 to expose the spindles 54 and 80 so they enter the row B. The direction of movement of the spindles in their paths or orbits is indicated by an arrow Z in Figure 4. This direction of movement is clockwise as viewed from above, so that the spindles move rearwardly, entering the plant row from the outside, or the left, and being withdrawn or retracted from the row rearwardly and to the left. The spindles are then moved into position to be doffed by a left-hand outer doffing means 88 including a series of doffers similar to the doffers 64 but which rotate in a clockwise direction as seen in Figure 4. A portion of the plate 58 has been broken away at 90 to expose the doffing means 88. Cotton removed by the doffing means 88 from the spindles 80 is thrown forwardly by the doffers to conveying or receiving means in the form of a vertical tube 92 which, like the vertical tube 70 for the inner drum IDL, forms part of the left-hand pneumatic conveying system CL.

As stated above, the right-hand picking unit PR and the left-hand picking unit PL are symmetrical. The relationship between these two units can best be seen in Figure 2. In this figure, the legends IDL' and ODL' designate respectively the vertical centerlines of the left-hand inner drum and the left-hand outer drum. This designation of parts will serve to orient Figure 2 with Figure 4.

The legends IDR' and ODR' designate respectively the right-hand inner drum centerline and the right-hand outer drum centerline to evidence the presence of a pair of right-hand picking elements similar in details to the left-hand elements and symmetrically arranged. It will be seen from Figure 2 that the two inner elements or drums, which are substantially smaller than the outer elements or drums, are relatively closely spaced and are in transverse alinement. The outer drums are relatively widely spaced apart transversely and are in transverse alinement on a line ahead of the transverse line through the inner drums IDR and IDL. Stated otherwise, the inner drum of each unit is offset rearwardly and inwardly from its companion outer drum and each inner drum structure is confined wholly to its own side of the longitudinal centerline of the machine.

The right-hand picking unit PR includes casing or supporting structure 94 symmetrical with the casing or supporting structure 22 for the left-hand unit. Likewise, the unit PR has vertical tubular cotton outlet conduits 96 and 98 associated respectively with doffers (not shown) for the right-hand inner and outer drums, these tubular conduits being part of cotton-receiving means for the right-hand pneumatic conveying system CR. The inner side of the right-hand unit PR is provided with an upright longitudinal wall 100 (Figure 2) which closely parallels the comparable wall 72 of the unit PL. The wall 100 closes the inner or left-hand side of the right-hand inner drum structure IDR.

The combined supporting structure 22—94 for the picking means PL, PR extends transversely across the frame F between the longitudinal upright outer planes or faces of the wheels TL and TR and provides, in addition to right- and left-hand inner compartments ICR and ICL respectively for the right- and left-hand inner picking elements IDR and IDL, right- and left-hand outer compartments OCR and OCL respectively for the right- and left-hand outer picking elements ODR and ODL. The left-hand inner and outer compartments ICL and OCL are shown in detail, as related to the components therein, in Figure 4. Although corresponding details for the right-hand compartments OCR and ICR and their components are not specifically illustrated, the presence thereof and their symmetrical relationship to the left-hand compartments and components will be appreciated from the over-all disclosure, especially Figure 2.

The left-hand inner compartment ICL has a rearward extension ICEL and the outer compartment OCL has a forward, laterally outward extension or wing part OCEL. The compartment ICL is thus relatively long and narrow, because of the relatively small lateral dimension between the row B and the centerline of the machine, whereas the outer compartment is relatively wide because of the greater dimension between the row B and the outer side of the unit, which lies in the plane of the wheel shield 102. The right-hand unit has symmetrically arranged compartment extensions providing a forward, laterally outward extension or wing part OCER and a rearward extension ICER. As best shown in Figure 2, the two rear extensions combine to form a central rear part ICEL—ICER centered on the centerline of the frame F.

The lateral extension OCEL is ahead of the front of the traction wheel TL, and the rearward extension is accommodated by the left-hand half of the forwardly opening accommodation space $S^1$ ahead of the axle S and the inner faces of the wheels TR and TL. The rearward extension of the right-hand inner compartment occupies the right-hand half of this space (Figure 2), while the lateral extension of the right-hand outer compartment lies ahead of the front of the wheel TR. These compartment extensions respectively contain the doffing means and the cotton outlets, as will be apparent from Figures 2 and 4. The unit PL is provided with a rearwardly extending, upright shield 102 which lies along the outer face of the left-hand traction wheel TL. The right-hand unit PR is provided with a similar shield 104 which lies along the outer plane of the right-hand traction wheel TR. It will be seen from Figure 2 that the transverse dimension between the right- and left-hand outer sides PRO and PLO is such that these outer sides are respectively substantially in longitudinal alinement with the outer faces TRO and TLO of the wheels TR and TL, and the overall width of the machine is therefore substantially less than the distance between the rows C and D. Thus, the machine may operate on the two adjacent rows A and B without materially interfering with the plants in the remote rows C and D.

The right-hand unit PR has outer and inner doffing means respectively in the compartment extensions OCER and ICER. These doffing means are not shown but the presence and the relation thereof to the picking elements ODR and IDR are deemed obvious on the basis of the exemplary details of the left-hand doffing means 63 and 88.

For the purpose of facilitating entry of the plants to the units PR and PL, the units are provided respectively with structure comprising plant-receiving throats 106 and 108.

Inasmuch as the inner drum of each unit contains fewer columns and spindles than its companion outer drum, it has less capacity than its companion outer drum. However, since the outer drums lead the inner drums, they pick the greater percentage of cotton from plants respectively in the rows A and B. Hence, the reduced capacity of the inner drums IDR and IDL does not materially affect the over-all efficiency of the machine, especially when considered in connection with the advantages obtained by the close association of the drums, particularly the association head of the frame F and in a position from which an operator at the operator's station O can readily observe plants in both rows A and B.

The picking means comprising the picking units PR and PL is supported at the forward end of the frame by means including a transverse rockshaft 110, a right-hand supporting arm 112, a left-hand supporting arm 114 and a center supporting arm 116. These arms are rigidly fixed at their rear ends to the rockshaft 110 and are pivotally connected at their forward ends respectively to a plurality of brackets 118, 120 and 122 and 124, the latter two combining at the inner portions of the picking units PR and PL to accomplish a connection with the forward end of the central arm 116.

The picking units PR and PL are adjusted vertically through the arms 112, 114 and 115 by fluid-pressure means including hydraulic cylinder and piston assemblies 126 and 128 located respectively at the right- and left-hand sides of the machine. Assist springs 130 and 132 are respectively associated with the cylinder and piston assemblies 126 and 128. This arrangement may follow conventional constructions and need not be amplified here.

Driving mechanism

As previously stated, the machine is powered by the internal combustion engine E, which drives through appropriate power-transmitting means included in the gear casing G, the transmission and differential H, the transverse axle structure S and the traction wheels TR and TL. The gear housing H carries a forwardly projecting shaft (not shown) to the forward end of which is keyed a pair of sprockets 134 and 136. A chain 138 from the sprocket 134 drives a larger sprocket 139 on a longitudinal short shaft 140 at the left-hand side of the frame F. This shaft is connected by appropriate universal joints 141 and 143 and a propeller shaft 142 to an input shaft 144 that projects from a rear portion of the casing structure 22 of the left-hand unit PL. The shaft 144 supplies power for the sprocket 28 and gears 26 and 53 previously described.

The other sprocket 136 from the gear casing G drives through a chain 146 to a sprocket 147 on a shaft 148 similar to the shaft 140 but located at the right-hand side of the frame. This shaft is connected by appropriate universal joints 149 and 151 and a forwardly extending propeller shaft 150 to an input shaft 152 for the right-hand unit PR. This shaft supplies power to the mechanism of the right-hand unit, much in the manner that the shaft 144 furnishes power for the mechanism in the left-hand unit.

The pneumatic conveying system CL, CR includes a pair of suction fan means enclosed in housings generally visible in Figure 1 and designated by the numerals 154 and 156, these fan housings having appropriate inlets connected to the conduits CR and CL, and discharge outlet branches 154a and 156a merging into a main discharge conduit 157 that leads into the receptacle K. A transverse shaft 158 from the gear housing G carries a pair of pulleys 160 about which belts 162 (Figure 1) are trained to drive the blowers (not shown) in the blower housings 154 and 156.

Operation and summary

The machine is readily maneuvered by the operator and is driven onto the field so that the throats 106 and 108 of the picking units PR and PL, respectively, are centered on the plants in adjacent rows, such as the rows A and B indicated in Figure 2. The spindles of the drums move rearwardly as the machine progresses forwardly picking cotton from both sides of both rows. The longitudinal offset of the inner and outer drums in each unit prevents overlapping or conflict between the spindles as the spindles on each drum enter the rows. As stated above, the inner drum of each unit is of reduced capacity and the smaller size thereof incident to such reduced capacity enables the positioning of the two inner drums in closely spaced, substantially side-by-side relationship. Each drum is structurally and functionally confined to its own side of the longitudinal centerline of the machine or the longitudinal centerline midway between the rows A and B. Hence, the spindles of the drums IDR and IDL cannot overlap or conflict across the longitudinal centerline referred to. Location of the units ahead of the machine enables the operator to positively guide the machine, since he can simultaneously observe plants in both rows being operated on. The entire picking means is confined between the longitudinal upright outer planes of the wheels, so that the over-all width of the machine is relatively narrow and the machine does not interfere with plants in rows adjacent to those being picked.

Other incidents of operation are similar to those machines of the one-row type known to those versed in the art and further description thereof will be unnecessary here.

The self-contained characteristic of either of the units PR or PL renders the machine highly flexible from the standpoint of design, operation and maintenance. Although the units are used together in a two-row machine, they may be furnished separately so that one or the other can be replaced without necessitating the replacement of the other. Other advantages and important features of the invention not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. A cotton-picking machine for operation in a field in which cotton is planted in conventional parallel rows spaced uniformly apart, comprising: a longitudinal mobile frame having a transverse axle and right- and left-hand carrying wheels respectively at opposite ends of the axle to carry the machine forwardly over the field with the longitudinal centerline of the frame centered between a pair of adjacent, right- and left-hand rows, said right- and left-hand wheels being co-axially spaced apart so as to run just to the right and just to the left respectively of said right- and left-hand rows, and the relationship between said wheels and axle being such as to define a forwardly opening accommodation space ahead of the axle and between the inner faces of the wheels; housing structure carried on the frame ahead of the wheels and axle and provided with parallel, fore-and-aft right- and left-hand plant-receiving throats at opposite sides of and spaced equidistantly from the frame centerline so as to respectively receive plants in the right- and left-hand rows; said structure including relatively long and narrow, right- and left-hand inner compartments respectively between the frame centerline and the right- and left-hand throats; said structure further being of such transverse dimension as to extend laterally rightwardly and leftwardly from the frame centerline respectively ahead of the fronts of the right- and left-hand wheels to right- and left-hand outer sides substantially in longitudinal alinement respectively with the outer faces of said right- and left-hand wheels, whereby the transverse dimension between each throat and its respective outer side of said structure exceeds that between each throat and the frame centerline; said structure also having right- and left-hand outer compartments respectively between the throats and the outer sides of said structure, each outer compartment having a laterally outward extension ahead of the front of the respective wheel and accommodated by said excess transverse dimension; right- and left-hand, transversely alined outer picking elements located respectively in the outer compartments and operative to pick cotton simultaneously from the outer sides of plants received respectively in the right- and left-hand throats; right- and left- hand outer doffing means located respectively in the outward extensions of the outer compartments and ahead of the fronts of the wheels to remove cotton respectively from the outer picking elements; transversely alined right- and left-hand inner picking elements located respectively in the inner compartments and offset to the rear of the outer picking elements but ahead of the axle structure and operative to pick cotton simultaneously from the inner sides of plants received respectively in the right- and left-hand throats; said structure further extending rearwardly into the aforesaid accommodation space ahead of the axle to provide rearward extensions respectively of the inner compartments; and right- and left-hand inner doffing means located respectively in said rearward extensions in transverse alinement and confined to opposite sides of the frame centerline for removing cotton respectively from the inner picking elements.

2. The invention defined in claim 1, further including: right- and left-hand outer cotton-outlet means communicating respectively with the lateral extensions of the outer compartments directly ahead of the respective outer doffing means; and right- and left-hand inner cotton-outlet means communicating respectively with the rearward extensions of the inner compartments and located directly rearwardly of the respective inner doffing means.

3. A cotton-picking machine for operation in a field in which cotton is planted in conventional parallel rows spaced apart uniformly, comprising: a mobile frame having right- and left-hand sides and movable forwardly over such field with the fore-and-aft centerline thereof centered between a pair of adjacent, right- and left-hand rows; housing structure carried by the frame and centered on the frame centerline, and provided with parallel right- and left-hand plant-receiving throats extending fore and aft in side-by-side relationship and so arranged as to respectively receive plants in said right- and left-hand rows; said housing structure including relatively narrow, right- and left-hand inner compartments respectively between the frame centerline and the right- and left-hand throats; said housing structure further being of such transverse dimension as to extend laterally rightwardly and leftwardly from the frame centerline respectively past the right- and left-hand throats to have right- and left-hand outer sides respectively beyond the centerlines between the right- and left-hand rows and the next adjacent rightward and leftward rows, respectively, whereby the transverse dimension between each throat and the respective outer side of the housing structure substantially exceeds that between each throat and the frame centerline; said housing structure also including right- and left-hand outer compartments respectively between the right- and left-hand throats and said right- and left-hand outer sides of said structure, said outer compartments each being relatively wider than the inner compartments because of the aforesaid difference in transverse dimension; right- and left-hand outer picking elements located respectively in the outer compartments and transversely alined, and right- and left-hand inner picking elements located respectively in said inner compartments and transversely alined in closely fore-and-aft offset relationship to the outer elements; each of said elements being of the type including a plurality of vertically spaced series of picking spindles and guide means for guiding the spindles of each series for movement in a horizontal orbit; each of said inner elements being arranged so that a portion of its spindle-orbit overlaps outwardly over its respective throat but is confined inwardly to its own side of the frame centerline, and each of said outer elements being arranged so that a portion of its spindle-orbit overlaps inwardly over its respective throat but is confined within its own outer side of the housing structure; and each of said inner elements having fewer spindles than each outer element, and the guide means of the elements being so constructed and arranged on the basis of the aforesaid difference in the transverse dimensions of the inner and outer compartments that the spindle-orbit of each inner element is substantially smaller than the spindle-orbit of each outer element.

4. The invention defined in claim 3, further characterized in that: the front-to-rear offset of the inner picking elements relative to the outer picking elements is such that the outer picking elements are ahead of the inner picking elements; each inner compartment includes a communicative rearward extension directly behind the respective inner picking element and confined in width between the frame centerline and the respective throat, and each such rearward extension contains an inner doffing means for removing cotton from the spindles of the respective inner picking element; and each outer compartment extends laterally outwardly in excess of the transverse dimension of the spindle orbit of the respective outer picking elment and contains an outer doffing means laterally outwardly of and for removing cotton from the spindles of the respective outer picking element.

5. A cotton-picking machine for operation in a field in which cotton is planted in conventional parallel rows spaced apart uniformly, comprising: a mobile frame having right- and left-hand sides and movable forwardly over such field with the fore-and-aft centerline thereof centered between a pair of adjacent, right- and left-hand rows; housing structure carried by the frame and centered on the frame centerline, and provided with parallel right- and left-hand plant-receiving throats extending fore and aft in side-by-side relationship and so arranged as to respectively receive plants in said right- and left-hand rows; said housing structure including relatively narrow, right- and left-hand inner compartments respectively between the frame centerline and the right- and left-hand throats; said housing structure further being of such transverse dimension as to extend laterally rightwardly and leftwardly from the frame centerline respectively past the right- and left-hand throats to have right- and left-hand outer sides respectively beyond the centerlines between the right- and left-hand rows and the next adjacent rightward and leftward rows, respectively, whereby the transverse dimension between each throat and the respective outer side of the housing structure substantially exceeds that between each throat and the frame centerline; said housing structure also including right- and left-hand outer compartments respectively between the right- and left-hand throats and said right- and left-hand outer sides of said structure, said outer compartments each being relatively wider than the inner compartments because of the aforesaid difference in transverse dimension; right- and left-hand outer picking elements located respectively in the outer compartments and transversely alined, and right- and left-hand inner picking elements located respectively in said inner compartments and transversely alined in closely fore-and-aft offset relationship to the outer elements; each of said inner elements having picking members capacitated to reach outwardly from its compartment and into its respective throat to pick a quantity of cotton from the inner sides of plants received in said throat and each of said outer elements having picking members capacitated to reach inwardly from its compartment and into its respective throat to pick a quantity of cotton from the outer sides of plants received in said throat; said elements being so proportioned and constructed on the basis of the aforesaid excess in width of each outer compartment over each inner compartment that the picking capacity of each outer element is proportionately greater than that of each inner element whereby the quantity of cotton picked by each outer element is compensatively greater than the quantity picked by each inner element.

6. A cotton-picking machine for operation in a field in which cotton is planted in conventional parallel rows spaced apart uniformly, comprising: a mobile frame having right- and left-hand sides and movable forwardly over such field with the fore-and-aft centerline thereof centered between a pair of adjacent, right- and left-hand rows; cotton-picking mechanism carried by the frame and including means providing fore-and-aft extending right- and left-hand plant-receiving throats at opposite sides of and spaced equidistantly respectively to the right and left from the frame centerline on the order of the spacing of said right- and left-hand rows; said mechanism including relatively narrow, right- and left-hand inner portions respectively to the left and right of the right- and left-hand throats and limited in width by the transverse distance between the frame centerline and each throat; said mechanism also including right- and left-hand outer portions respectively to the right and left of the right- and left-hand throats and limited in width only by the available transverse distance between a throat and plants in a row next outwardly adjacent to the row of plants received in such throat, asid outer compartments each being thereby relatively wider than the inner compartments because of the aforesaid difference in transverse distances inwardly and outwardly of the throat; said right- and left-hand outer portions respectively including right- and left-hand, transversely alined outer picking elements, and said right- and left-hand inner portions respectively including right- and left-hand inner picking elements transversely alined in closely fore-and-aft offset relationship to the outer elements; each of said elements being of the type including a plurality of vertically spaced series of picking spindles and guide means for guiding the spindles of each series for movement in a horizontal orbit; each of said inner elements being arranged so that a portion of its spindle-orbit overlaps outwardly over its respective throat but is confined inwardly to its own side of the frame centerline, and each of said outer elements being arranged so that a portion of its spindle-orbit overlaps inwardly over its respective throat but extends outwardly within the aforesaid limit; and the guide means of the elements being so constructed and arranged on the basis of the aforesaid difference in the widths of the inner and outer mechanism portions that the spindle-orbit of each inner element is substantially narrower than the spindle-orbit of each outer element.

7. A cotton-picking machine for operation in a field in which cotton is planted in conventional parallel rows spaced apart uniformly, comprising: a mobile frame having right- and left-hand sides and movable forwardly over such field with the fore-and-aft centerline thereof centered between a pair of adjacent, right- and left-hand rows; cotton-picking mechanism carried by the frame and including means providing fore-and-aft, right- and left-hand plant-receiving throats at opposite sides of and spaced equidistantly respectively to the right and left from the frame centerline on the order of the spacing of said right- and left-hand rows; said mechanism including relatively narrow, right- and left-hand inner portions respectively to the left and right of the right- and left-hand throats and limited in width by the transverse distance between the frame centerline and each throat; said mechanism also including right- and left-hand outer portions respectively to the right and left of the right- and left-hand throats and limited in width only by the available transverse distance between a throat and plants in a row next outwardly adjacent to the row of plants received in such throat, said outer compartments each being thereby relatively wider than the inner compartments because of the aforesaid difference in transverse distances inwardly and outwardly of the throat; said right- and left-hand outer portions respectively including right- and left-hand, transversely alined outer picking elements, and said right- and left-hand inner portions respectively including right- and left-hand inner picking elements transversely alined in closely fore-and-aft offset relationship to the outer elements; each of said inner elements having picking members capacitated to reach into its respective throat from the inner side thereof to pick a quantity of cotton from the inner sides of plants received therein, and each of said outer elements having picking members capacitated to reach into its respective throat from the outer side thereof to pick a quantity of cotton from the outer sides of plants received in said throat; said elements being so proportioned and constructed on the basis of the aforesaid difference in widths of the inner and outer mechanism portions that the picking capacity of each outer element is proportionately greater than that of each inner element whereby the quantity of cotton picked by each outer element is compensatively greater than the quantity picked by each inner element.

8. A cotton-picking attachment for use with a vehicle in a field in which cotton is planted in conventional parallel rows spaced uniformly apart, wherein such vehicle has a longitudinal and mobile frame including a transverse axle and right- and left-hand carrying wheels respectively at opposite ends of the axle to carry the machine forwardly over the field with the longitudinal centerline of the frame centered between a pair of adjacent, right- and left-hand rows, said right- and left-hand wheels being coaxially spaced apart so as to run just to the right and just to the left respectively of said right- and left-hand rows, and the relationship between said wheels and axle being such as to define a forwardly opening accommodation space ahead of the axle and between the inner faces of the wheels, said attachment comprising: transverse housing structure having means for the mounting thereof on the frame ahead of the wheels and axle structure and provided with parallel, right- and left-hand plant-receiving throats symmetrically arranged relative to the longitudinal centerline of the housing structure and adapted to be equidistantly spaced respectively to the right and left of the frame centerline so as to respectively receive plants in the right- and left-hand rows; said structure including relatively long and narrow, right- and left-hand inner compartments respectively between the housing structure centerline and the right- and left-hand throats; said structure further being of such transverse dimension as to extend laterally rightwardly and leftwardly from said centerline respectively ahead of the fronts of the right- and left-hand wheels to right- and left-hand outer sides adapted to be substantially longitudinally alined respectively with the outer faces of said right- and left-hand wheels, whereby the transverse dimension between each throat and its respective outer side of said structure exceeds that between each throat and the housing structure centerline; said structure also having right- and left-hand outer compartments respectively between the throats and the outer sides of said structure, each outer compartment having a laterally outward extension positionable ahead of the front of the respective wheel and accommodated by said excess transverse dimension; right- and left-hand, transversely alined outer picking elements located respectively in the outer compartments and operative to pick cotton simultaneously from the outer sides of plants received respectively in the right- and left-hand throats; right- and left-hand outer doffing means located respectively in the outward extensions of the outer compartments to remove cotton respectively from the outer picking elements; transversely alined right- and left-hand inner picking elements located respectively in the inner compartments and offset to the rear of the outer picking elements but positionable ahead of the axle structure and operative to pick cotton simultaneously from the inner sides of plants received respectively in the right- and left-hand throats; said structure being further shaped to extend rearwardly into the aforesaid accommodation space ahead of the axle to provide rearward extensions respectively of the inner compartments; and right- and left-hand inner doffing means located respectively in said rearward extensions in transverse alinement and confined to opposite sides of the frame centerline for removing cotton respectively from the inner picking elements.

9. The invention defined in claim 8, further including: right- and left-hand outer cotton-outlet means communicating respectively with the lateral extensions of the outer compartments directly ahead of the respective outer doffing means; and right- and left-hand inner cotton-outlet means communicating respectively with the rearward extensions of the inner compartments and located directly rearwardly of the respective inner doffing means.

10. A cotton-picking attachment for use with a vehicle in a field in which cotton is planted in conventional parallel rows spaced apart uniformly, wherein such vehicle includes a mobile frame having right- and left-hand sides and is movable forwardly over such field with the fore-and-aft centerline thereof centered between a pair of adjacent, right- and left-hand rows, said attachment comprising: transverse housing structure adapted to be carried by the frame with its longitudinal centerline centered on the frame centerline, and provided with parallel right- and left-hand plant-receiving throats extending fore and aft in side-by-side relationship and so arranged as to respectively receive plants in said right- and left-hand rows; said housing structure including relatively narrow, right- and left-hand inner compartments respectively between the housing structure centerline and the right- and left-hand throats; said housing structure further being of such transverse dimension as to extend laterally rightwardly and leftwardly from said centerline respectively past the right- and left-hand throats to have right- and left-hand outer sides respectively beyond the centerlines between the right- and left-hand rows and the next adjacent rightward and leftward rows, respectively, whereby the transverse dimension between each throat and the respective outer side of the housing structure substantially exceeds that between each throat and the housing structure centerline; said housing structure also including right- and left-hand outer compartments respectively between the right- and left-hand throats and said right- and left-hand outer sides of said structure, said outer compartments each being relatively wider than the inner compartments because of the aforesaid difference in transverse dimension; right- and left-hand outer picking elements located respectively in the outer compartments and transversely alined, and right- and left-hand inner picking elements located respectively in said inner compartments and transversely alined in closely fore-and-aft offset relationship to the outer elements; each of said elements being of the type including a plurality of vertically spaced series of picking spindles and guide means for guiding the spindles of each series for movement in a horizontal orbit; each of said inner elements being arranged so that a portion of its spindle-orbit overlaps outwardly over its respective throat but is confined inwardly to its own side of the housing structure centerline, and each of said outer elements being arranged so that a portion of its spindle-orbit overlaps inwardly over its respective throat but is confined within its own outer side of the housing structure; and each of said inner elements having fewer spindles than each outer element, and the guide means of the elements being so constructed and arranged on the basis of the aforesaid difference in the transverse dimensions of the inner and outer compartments that the spindle-orbit of each inner element is substantially smaller than the spindle-orbit of each outer element.

11. A harvester for picking cotton in a field in which the cotton has been planted in uniformly spaced parallel rows, comprising: a vehicle frame including a transverse axle structure and right- and left-hand wheels carrying the frame for advance over the field with the frame centered on the centerline between two adjacent parallel rows and with the right- and left-hand wheels spaced apart to straddle, and to travel respectively closely along the right- and left-hand sides of, said two rows, and the relationship between said axle structure and wheels being such as to provide a forwardly opening accommodation space between the wheels and ahead of the axle structure; cotton-handling mechanism positioned ahead of the axle structure and supported on the frame, said mechanism including symmetrical right- and left-hand cotton-handling units respectively at opposite sides of said centerline between said two rows and respectively including longitudinal right- and left-hand plant-receiving throats for accepting plants respectively in said two rows; said units combining to form supporting and housing structure including a central rear part within the aforesaid mounting space and right- and left-hand forward wing parts located respectively ahead of the fronts of said right- and left-hand wheels; each unit including outer and inner picking devices mounted respectively at the outer and inner sides of the associated throat and respectively in the associated extension and rear parts of said structure, said outer devices being transversely alined to pick simultaneously from the outer sides of said two rows, and said inner devices being transversely alined to pick simultaneously from the inner sides of said two rows; each unit further including an outer doffing means and an inner doffing means, each outer means being offset in a laterally outward direction from its associated outer picking device and mounted in the associated wing part of said structure and each inner means being mounted substantially directly behind its associated inner picking device and in the rear part of said structure; and each unit further having an outer conveying means and an inner conveying means, each outer conveying means being mouted in a wing part of said structure outwardly and forwardly of its associated outer doffing means, and the two inner conveying means being mounted in the rear part of said structure respectively substantially directly behind the inner doffing means.

12. A harvester for picking cotton in a field in which the cotton has been planted in uniformly spaced parallel rows, comprising: a vehicle frame including a transverse axle structure and right- and left-hand wheels carrying the frame for advance over the field with the frame centered on the centerline between two adjacent parallel rows and with the right- and left-hand wheels spaced apart to straddle, and to travel respectively closely along the right- and left-hand sides of, said two rows, and the relationship between said axle structure and wheels being such as to provide a mounting space between the wheels and ahead of the axle structure; separate right- and left-hand cotton-handling units of symmetrical construction arranged side-by-side respectively at opposite sides of said centerline between said two rows and ahead of the axle structure; means supporting the units on the frame; each unit having a longitudinal plant-receiving throat for accepting plants in the associated one of said two rows and each unit having inner and outer picking devices respectively inwardly and outwardly of the associated throat, said picking devices of each unit being offset from front to rear to dispose the inner devices in transverse alinement in close proximity to each other and in close proximity to the front of the axle structure and between the inner faces of the traction wheels, and to dispose the outer devices in transverse alinement and in relatively more widely spaced apart relationship ahead of the fronts of said wheels; each unit including inner and outer cotton-removing and -conveying means, the two inner means being positioned respectively to the rear of the inner devices, and the two outer means being positioned respectively laterally outwardly of the outer devices and respectively substantially within the planes of the outer faces of the wheels.

13. For use with a vehicle in the picking of cotton in a field in which the cotton has been planted in uniformly spaced parallel rows and wherein the vehicle has a frame including a transverse axle structure and right- and left-hand wheels carrying the frame for advance over the field with the frame centered on the centerline between two adjacent rows and with the right- and left-hand wheels spaced apart to straddle and to travel respectively closely along the right- and left-hand sides of said two rows, and wherein the relationship between the wheels and axle structure is such as to provide a forwardly opening accommodation space ahead of the axle structure and between the wheels; cotton-handling mechanism positionable ahead of the vehicle axle structure and comprising symmetrical right- and left-hand cotton-handling units respectively at opposite sides of said centerline between said two rows and respectively including longitudinal right- and left-hand plant-receiving throats for accepting plants respectively in said two rows; said units combining to form supporting and housing structure including a central rear part within the aforesaid mounting space and right- and left-hand forward wing parts located respectively ahead of the fronts of said right- and left-hand wheels; each unit including outer and inner picking devices mounted respectively at the outer and inner sides of the associated throat and in the associated wing and rear parts of said structure, said outer devices being transversely alined to pick simultaneously from the outer sides of said two rows, and said inner devices being transversely alined to pick simultaneously from the inner sides of said two rows; each unit further including an outer doffing means and an inner doffing means, each outer means being offset in a laterally outward direction from its associated outer picking device and mounted in the associated wing part of said structure and each inner means being mounted substantially directly behind its associated inner picking device and in the rear part of said structure; and each unit further having an outer conveying means and an inner conveying means, each outer conveying means being mounted in a wing part of said structure outwardly and forwardly of its associated outer doffing means, and the two inner conveying means being mounted in the rear part of said structure respectively substantially directly behind the inner doffing means; and means for mounting the mechanism on the vehicle.

14. A harvester for picking cotton in a field in which the cotton has been planted in uniformly spaced parallel rows, comprising: a vehicle frame including a transverse axle structure and right- and left-hand wheels carrying the frame for advance over the field with the frame centered on the centerline between two adjacent parallel rows and with the right- and left-hand wheels spaced apart to straddle, and to travel respectively closely along the right- and left-hand sides of, said two rows, the relationship between said axle structure and wheels being such as to provide a mounting space between the wheels and ahead of the axle structure; superstructure above the axle structure and extending forwardly of said axle structure and overhanging the aforesaid mounting space; an operator's station at a forward part of the superstructure; suction fan means on the superstructure behind the operator's station and having a pair of outer and a pair of inner transversely spaced apart cotton-receiving inlets and a cotton-discharge outlet; cotton-handling mechanism positioned ahead of the axle structure and supported on the frame, said mechanism including supporting and housing means having a central rear part bisected by the centerline between said two rows and located within said mounting space and below the superstructure, and a forward portion including right- and left-hand wing parts respectively ahead of the right- and left-hand wheels and ahead of the superstructure, each wing part having an outer side substantially in the plane of the outer face of the associated wheel; said mechanism including right- and left-hand longitudinal plant-receiving throats centered respectively on said two rows and extending back into said rear part and a pair of right-hand picking devices straddling the right-hand throat and a pair of left-hand picking devices straddling the left-hand throat; one device in each pair being confined to one lateral half of said rear part and the other device in each pair being confined to the associated wing part, whereby the devices in each pair are offset front to rear, the front devices being transversely alined and the rear devices being transversely alined; said mechanism further including a pair of right-hand and a pair of left-hand cotton-receiving means for removing cotton respectively from the picking devices; said right-hand means being located and confined respectively to the right-hand wing part and to the right-hand lateral half of the rear part, and said left-hand means being symmetrically arranged as to the left-hand wing part and left-hand lateral half of the rear part; and a pair of outer and a pair of inner conduit means connected respectively to the fan means inlets, each outer conduit means extending forwardly above the level of the superstructure and generally in the upright longitudinal plane of the outer side of the associated wing part and thence downwardly to enter said wing part forwardly and outwardly of the cotton-removing means in such wing part, and said inner conduit means extending forwardly above the level of the superstructure and downwardly in closely spaced relation and entering said rear part rearwardly of the associated cotton-removing means in said rear part.

15. A harvester for picking cotton in a field in which the cotton has been planted in uniformly spaced parallel rows, comprising: a vehicle frame including a transverse axle structure and right- and left-hand wheels carrying the frame for advance over the field with the frame centered on the centerline between two adjacent parallel rows and with the right- and left-hand wheels spaced apart to straddle, and to travel respectively closely along the right- and left-hand sides of, said two rows, the relationship between said axle structure and wheels being such as to provide a mounting space between the wheels and ahead of the axle structure; cotton-handling mechanism positioned ahead of the axle structure and supported on the frame, said mechanism including symmetrical right- and left-hand cotton-handling units respectively at opposite sides of said centerline between said two rows and respectively including longitudinal right- and left-hand plant-receiving throats for accepting plants respectively in said two rows; said units combining to form supporting and housing structure including a central rear part within the aforesaid mounting space and right- and left-hand forward wing parts located respectively ahead of the fronts of said right- and left-hand wheels; each unit including outer and inner picking devices mounted respectively at the outer and inner sides of the associated throat and in the associated wing and rear parts of said structure, said outer devices being transversely alined to pick simultaneously from the outer sides of said two rows, and said inner devices being transversely alined to pick simultaneously from the inner sides of said two rows; each unit further including an outer doffing means and an inner doffing means, each outer means being mounted outwardly of its associated outer picking device and in the associated wing part of said structure and each inner means being mounted substantially directly behind its associated inner picking device and in the rear part of said structure; suction fan means carried on the frame rearwardly of the cotton-handling mechanism and including right- and left-hand housings respectively centered generally on said two rows, each housing having an outer inlet and an inner inlet; four cotton-conveying conduit means connecting said inlets respectively with the four doffing means of the cotton-handling mechanism, including transversely widely spaced outer conduits connected respectively to the outer inlets and extending respectively to and communicating with the interior of the wing parts ahead of the outer doffing means, and closely spaced inner conduits connected respectively to the inner inlets and extending to and communicating with the interior of said rear part respectively to the rear of the inner doffing means.

LOUIS A. PARADISE.

References Cited in the file of this patent

UNITED STATES PATENTS

| Number | Name | Date |
| --- | --- | --- |
| 1,636,132 | Hoffnagle | July 19, 1927 |
| 2,023,491 | Rust et al. | Dec. 10, 1935 |
| 2,073,653 | Rust et al. | Mar. 16, 1937 |
| 2,140,631 | Johnston | Dec. 20, 1938 |
| 2,175,216 | Rust | Oct. 10, 1939 |
| 2,214,818 | Johnston | Sept. 17, 1940 |
| 2,352,291 | Scarratt | June 27, 1944 |
| 2,538,454 | Hart | Jan. 16, 1951 |